United States Patent
Dewan et al.

(10) Patent No.: US 11,861,009 B2
(45) Date of Patent: Jan. 2, 2024

(54) MECHANISM TO UPDATE ATTESTED FIRMWARE ON A PLATFORM

(71) Applicant: Intel Corporation, Santa Clara, CA (US)

(72) Inventors: Prashant Dewan, Portland, OR (US); Nivedita Aggarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 17/131,959

(22) Filed: Dec. 23, 2020

(65) Prior Publication Data

US 2021/0110042 A1   Apr. 15, 2021

(51) Int. Cl.
*G06F 21/57* (2013.01)
*H04L 9/08* (2006.01)

(52) U.S. Cl.
CPC .......... *G06F 21/572* (2013.01); *H04L 9/0816* (2013.01)

(58) Field of Classification Search
CPC ...... G06F 21/572; G06F 21/60; G06F 16/137; H04L 9/0816
See application file for complete search history.

(56) References Cited

U.S. PATENT DOCUMENTS

| | | | | |
|---|---|---|---|---|
| 2010/0008510 | A1* | 1/2010 | Zayas | G06F 21/572 713/193 |
| 2014/0082373 | A1* | 3/2014 | Colnot | G06F 21/575 713/193 |
| 2014/0109076 | A1* | 4/2014 | Boone | H04L 63/0823 717/170 |
| 2016/0036814 | A1* | 2/2016 | Conrad | H04L 9/0891 713/171 |
| 2019/0042230 | A1* | 2/2019 | Dewan | G06F 21/57 |
| 2021/0182398 | A1* | 6/2021 | Schack | G06F 21/575 |
| 2021/0240371 | A1* | 8/2021 | Rajagopalan | G06F 3/0653 |

* cited by examiner

*Primary Examiner* — Jaweed A Abbaszadeh
*Assistant Examiner* — Hyun Soo Kim
(74) *Attorney, Agent, or Firm* — Jaffery Watson Mendonsa & Hamilton LLP (57) ABSTRACT

An apparatus to facilitate permissions at a computing system platform is disclosed. The apparatus includes a plurality of agents, each including a non-volatile memory storing firmware executed to perform a function associated with the agent and attestation hardware to detect an update at the computing system platform, generate a cryptographic key associated with each of the plurality of agents, perform an attestation with a relying party using the generated cryptographic keys and receive a tuple associated with each of the plurality of agents, wherein a tuple includes one or more permissions indicating platform resources an agent is permitted to access.

20 Claims, 9 Drawing Sheets

MECHANISM TO UPDATE ATTESTED FIRMWARE ON A PLATFORM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol.

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit to other equally effective embodiments.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

In embodiments, an attestation mechanism is provided to report platform component firmware and generate keys based on the firmware measurement. In further embodiments, the keys are used to perform attestation with a computer system operating as a relying party. In still further embodiments, permissions tuples are received from a relying party for one or more components once the attestation has been completed.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
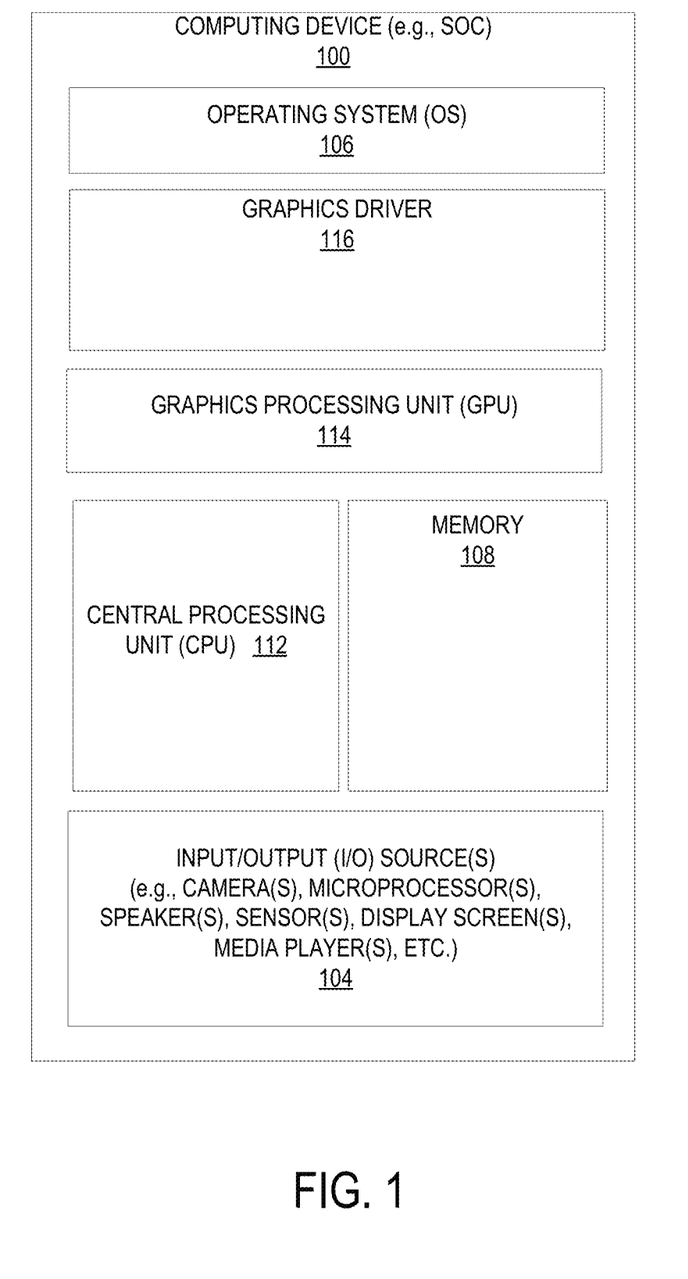
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
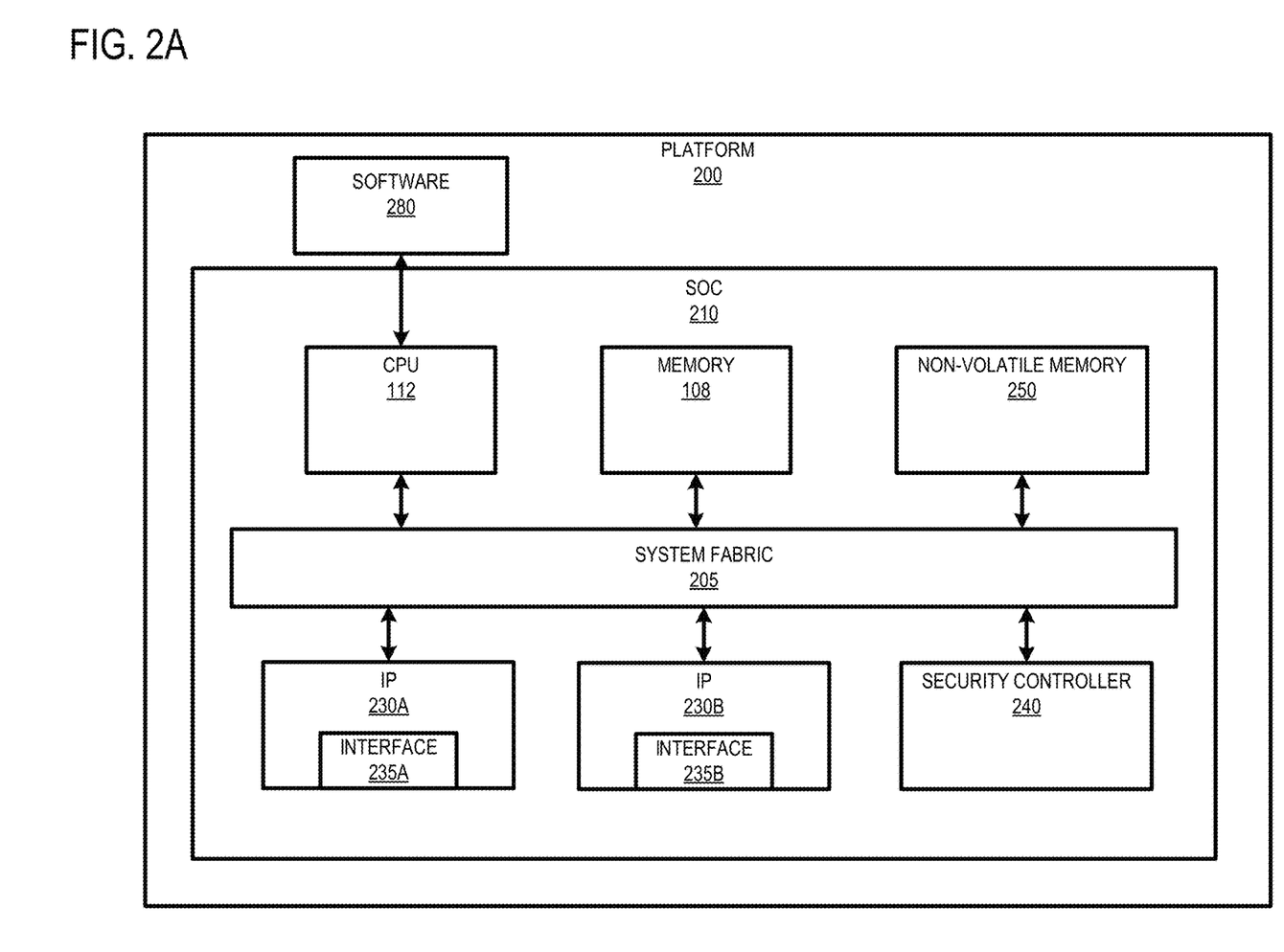
FIGS. 2A-2C illustrate embodiments of a platform.
Figure 2B:
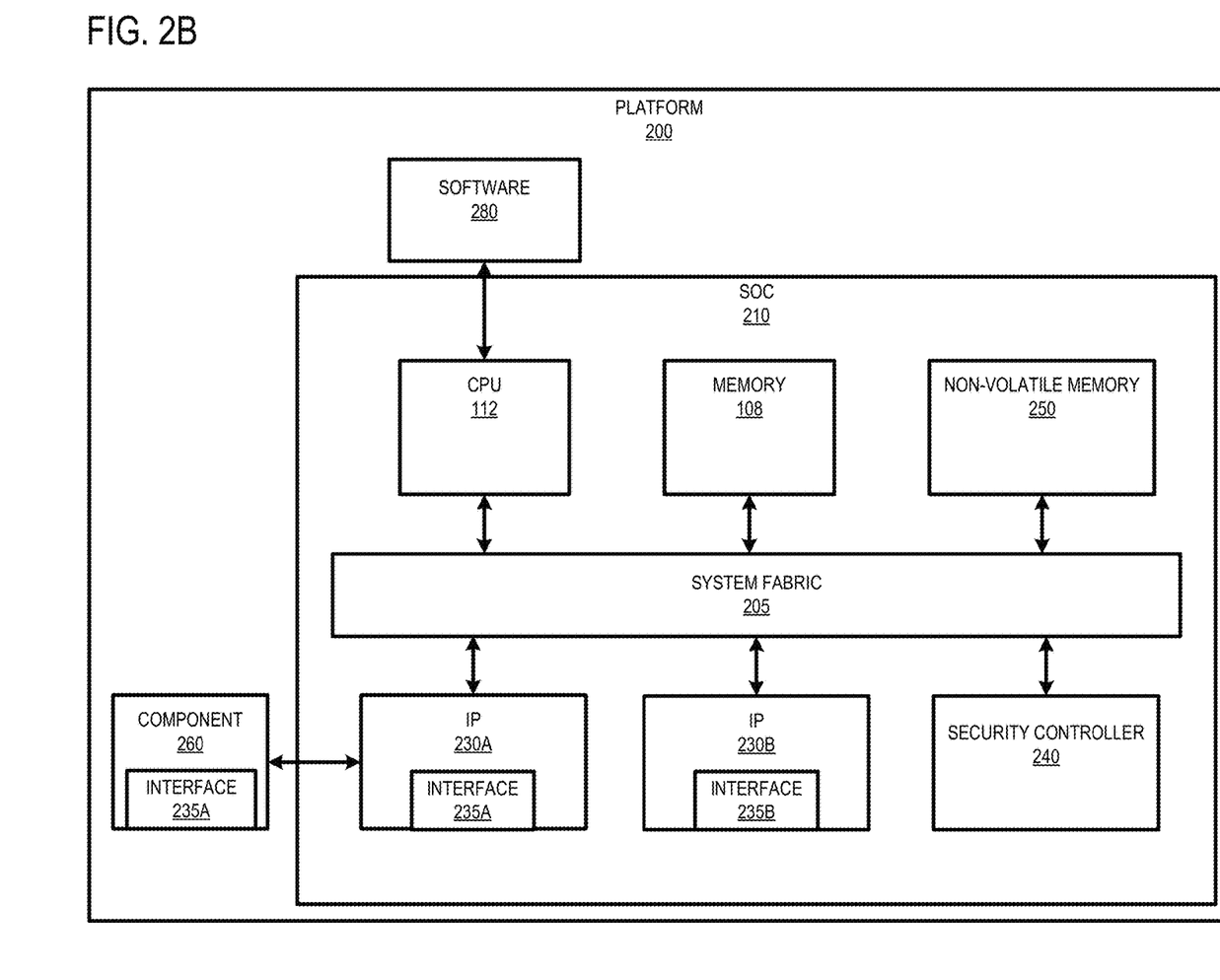
Figure 2C:
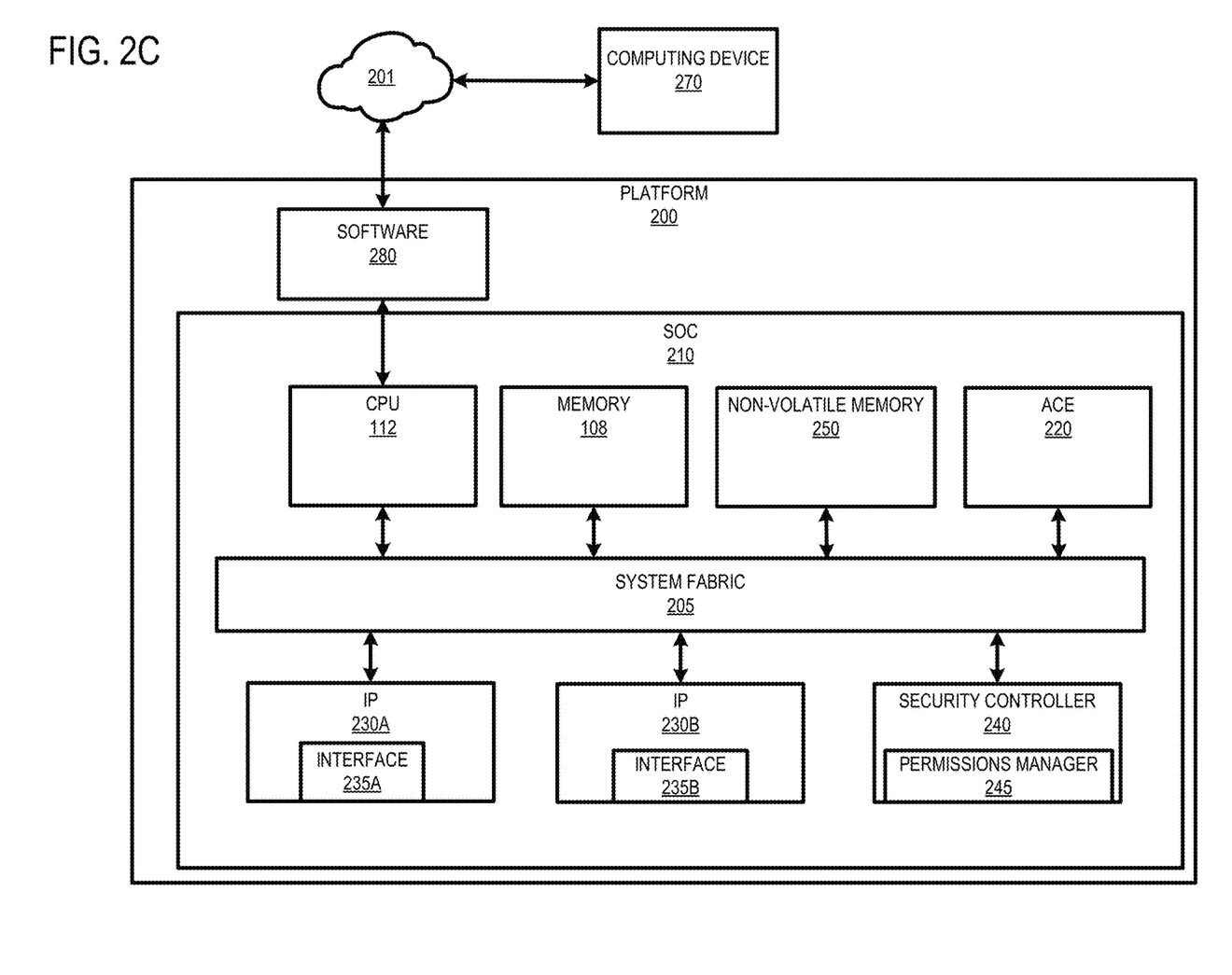

FIGS. 2A-2C illustrate embodiments of a platform 200 including a SOC 210 similar to computing device 100 discussed above. As shown in FIG. 2A, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents 230 to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., IP agents 235A and 235B) to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IPA agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives.

FIG. 2B illustrates another embodiment of platform 200 including a component 270 coupled to SOC 210 via IP agent 230A. In one embodiment, IP agent 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components. FIG. 2C illustrates yet another embodiment of platform 200 including a computing device 270 coupled to platform 200 via a cloud network 201. In this embodiment, computing device 270 comprises a cloud agent that is provided access to SOC 210 via software 280.

IP agents, such as IP agents 230, implement firmware for execution. Such firmware contributes to the security of SOC 210, and its measurements are securely reported to other components on platform, software and cloud agents. Thus, firmware is measured and loaded into IP agents via a secure boot on each IP agent, as well as the platform. Once the secure firmware is loaded on an IP agent, firmware measurements are performed and recorded in the hardware. These measurements are recorded in such a way (e.g., via security controller 240) that the platform can securely attest the measurements to a remote relying party. As used herein, a relying party is a server (e.g., computing device 270) that provides access to secure applications.

Once the platform attests to the relying party, the server provides authority to the platform hardware (e.g., via security controller 240) to grant software/firmware access to the platform resources, cloud resources or secrets. The platform is not allowed to modify the executing firmware after the firmware is attested to the relying party, unless a system reset and re-attestation is performed. This is because the relying party needs to know if the firmware is being modified prior to re-authorizing the platform. However, his scenario leads to a problem in which the platform has to be rebooted/reset whenever the firmware has to be updated. Multiple reboots impact the user experience and increases user frustration.

According to one embodiment, a mechanism is provided to update platform 200 firmware without rebooting, and to notify a relying party that the firmware has been updated. In such an embodiment, a cryptographic key is derived based on IP agent firmware measurements and authorizations are received from a relying party based on the measurements. In a further embodiment, platform 200 revokes authorizations upon receiving the new measurements, initiates a new attestation, and receives a new authorization from the relying party. In such an embodiment, the authorization allows read, write and execute (RWX) access to a platform or cloud resource, access to a key or ability to use a platform feature. As defined herein, measurements comprise data acquired from performing a hash on contents of firmware within an IP agent 230.

As shown in FIG. 2C, SOC 210 includes an attestation client engine (ACE) 220 that is implemented to measure all firmware within platform 200, including firmware included in ACE 220. In one embodiment, ACE 220 generates an asymmetric key and a corresponding certificate for each measurement. In this embodiment, firmware included in ACE 220 performs attestation with, and receives a voucher from, a relying party (e.g., computing device 270). In a further embodiment, the voucher includes a signed tuple including an IP agent ID and permissions (e.g., IP_ID, PERMISSIONS) that are applied to an associated IP agent 230, a tuple manager within ACE 220 and/or a permissions manager within security controller 240. In still a further embodiment, the permissions included in a tuple includes one or more platform resources that an IP agent 230 is permitted to access. A resource permission may include the following format: (Resource ID, Requestor ID, Permission).

In one embodiment, ACE 220 receives and writes the tuple to hardware, and verifies the tuple. Subsequently, the hardware grants permission to the resources outlined in the permissions included in the tuple. ACE 220 performs measurements of firmware within each IP agent 230 and generates a key associated with each IP agent 230 based on each firmware measurement. According to one embodiment, ACE 220 generates one key and a unique firmware hash per IP agent 230. In a further embodiment, the generated keys are used to perform attestation with a relying party.

Figure 3:
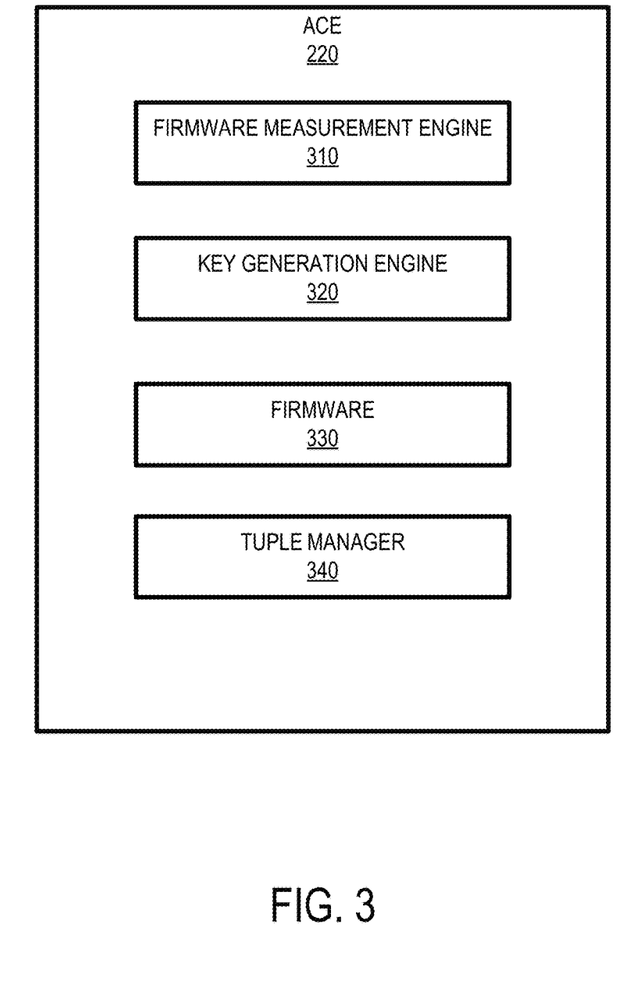
FIG. 3 illustrates one embodiment of an attestation client engine.

FIG. 3 illustrates one embodiment of ACE 220, including firmware measurement engine 310, key generation engine 320, firmware 330 and tuple manager 340. Firmware measurement engine 310 is implemented to perform the firmware measurements for each IP agent 230. Key generation engine 320 generates a unique key for each IP agent 230 (or IP key) based on measurements. In one embodiment, an IP key comprises a public key and a certificate rooted in the platform root of trust. In a further embodiment, the private key stays in the Key Generation Engine of ACE. In yet a further embodiment, key generation engine 320 measures the firmware on all IP agents 230, and provides a certificate and public key to the IP agent 230 firmware.

Firmware 330 to store the generated keys and perform attestation with the relying party via key generation engine 320. In such an embodiment, key generation engine 320 does not disclose the private key to the IP agent 230 firmware. Thus, only the certificate and a private key handle are exposed to IP agent 230 firmware. Once the attestation is complete, firmware 330 receives a permissions tuple from the relying party. The permissions tuple is subsequently submitted to tuple manager 340.

Tuple manager 340 receives the tuple, and verifies the permissions included in each tuple. In one embodiment, tuple manager 340 verifies a tuple signature prior to applying the permissions. Additionally, tuple manager 340 transmits the permissions to be applied at IP agents 230 and security controller 240. In a further embodiment, tuple manager 340 uses a cryptographic nonce mechanism to ensure the freshness of the tuple. A nonce is an arbitrary number that may be used just once in a cryptographic communication.

Figure 4:
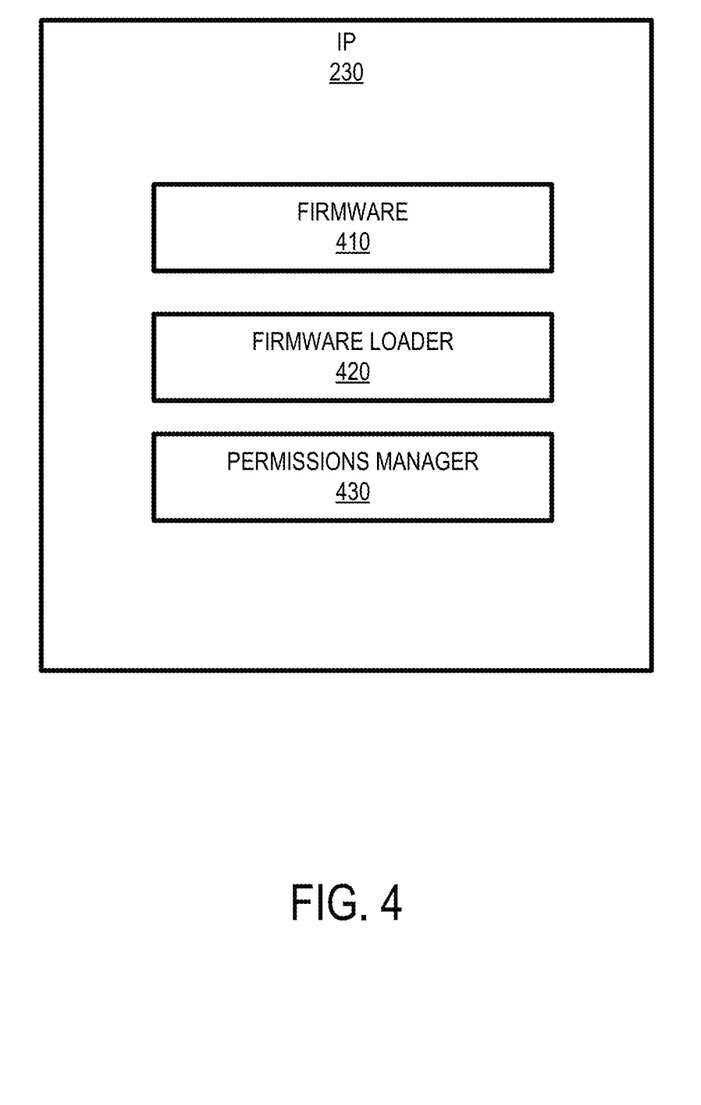
FIG. 4 illustrates one embodiment of an interconnect protocol agent.

FIG. 4 illustrates one embodiment of an IP agent 230, which includes firmware 410, firmware loader 420 and permissions manager 430. As discussed above, firmware 410 is implemented to perform execution. Permissions manager 430 receives permissions from tuple manager 340 and sets the permissions for IP agent 230. Upon setting the permissions, permissions manager 430 provides access to IP agent 230 resources, as well as other SOC 210 resources, to firmware 410. Additionally, permissions manager 430 revokes IP agent 230 permissions upon receiving an indication from tuple manager 340. In one embodiment, security controller also includes a permissions manager 245 (FIG. 2C) to provide permissions to SOC 210 global resources.

Figure 5A:
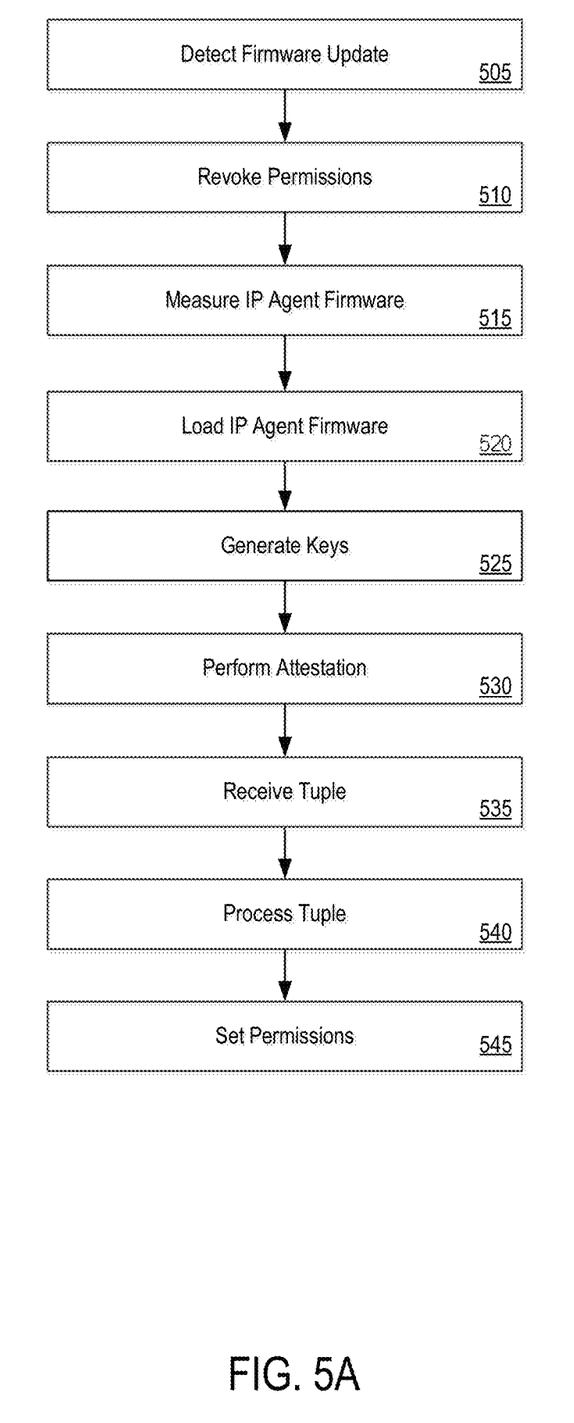
FIG. 5A is a flow diagram illustrating one embodiment of a process for setting permissions.

FIG. 5A is a flow diagram illustrating one embodiment of a process performed by ACE 220 for setting permissions. At processing block 505, a firmware update is detected. At processing block 510, indications are transmitted to permissions manager 430 at each IP agent 230 and permissions manager 245 at security controller 240 to revoke permissions. At processing block 515, firmware for each IP agent 230 is measured to generate measurement data. At processing block 520, the firmware measurement data is loaded in each IP agent 230.

Figure 5B:
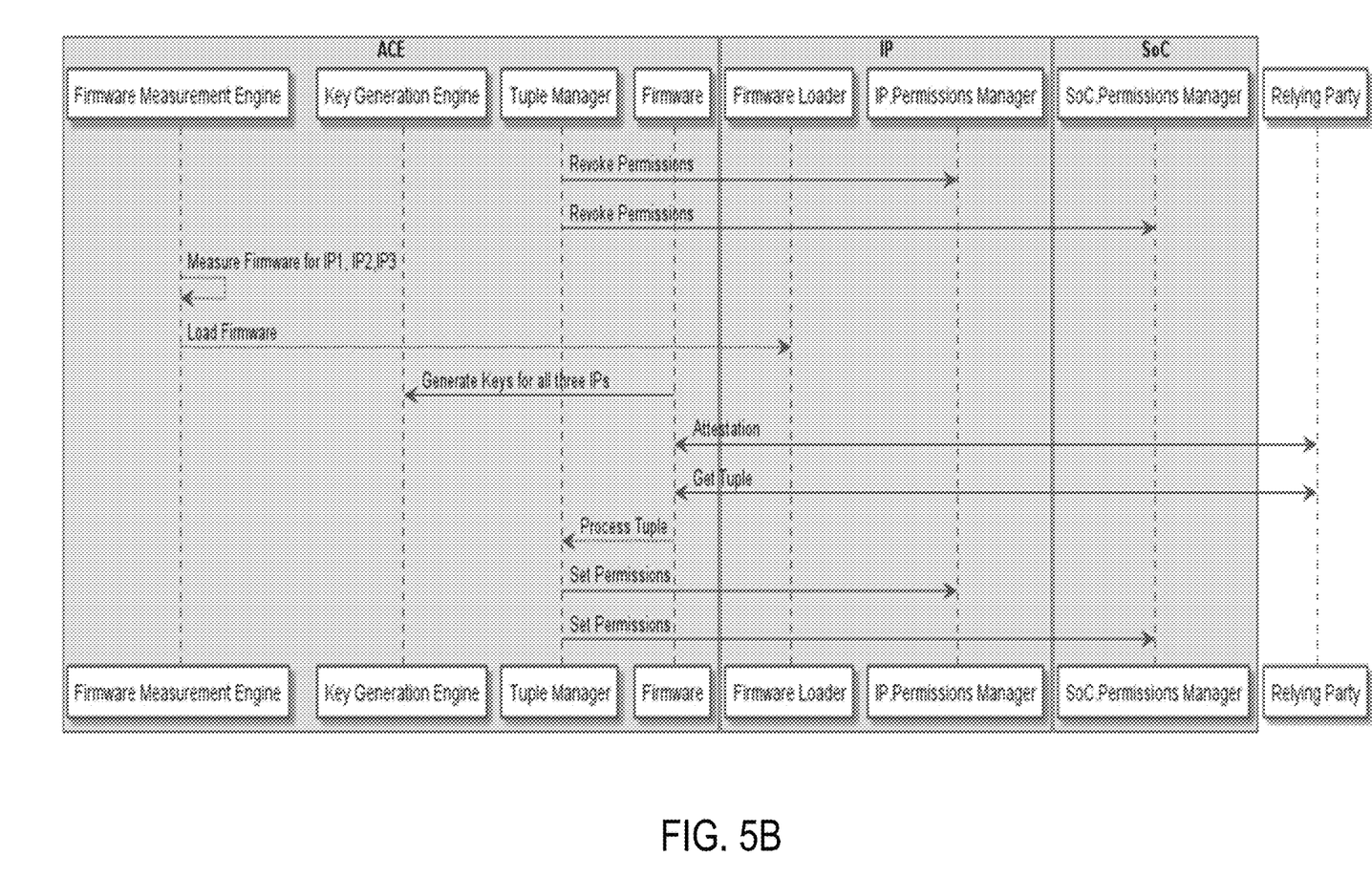
FIG. 5B illustrates one embodiment of a schematic diagram of a process for setting permissions.

At processing block 525, keys are generated for each IP agent 230. At processing block 530, attestation with a relying agent is performed. At processing block 535, tuples are received from the relying agent. At processing block 540, the tuples are processed. At processing block 545, indications are transmitted to permissions manager 430 at each IP agent 230 and permissions manager 245 at security controller 240 to set the new permissions. FIG. 5B illustrates one embodiment of a schematic diagram of a process for setting permissions.

Figure 6:
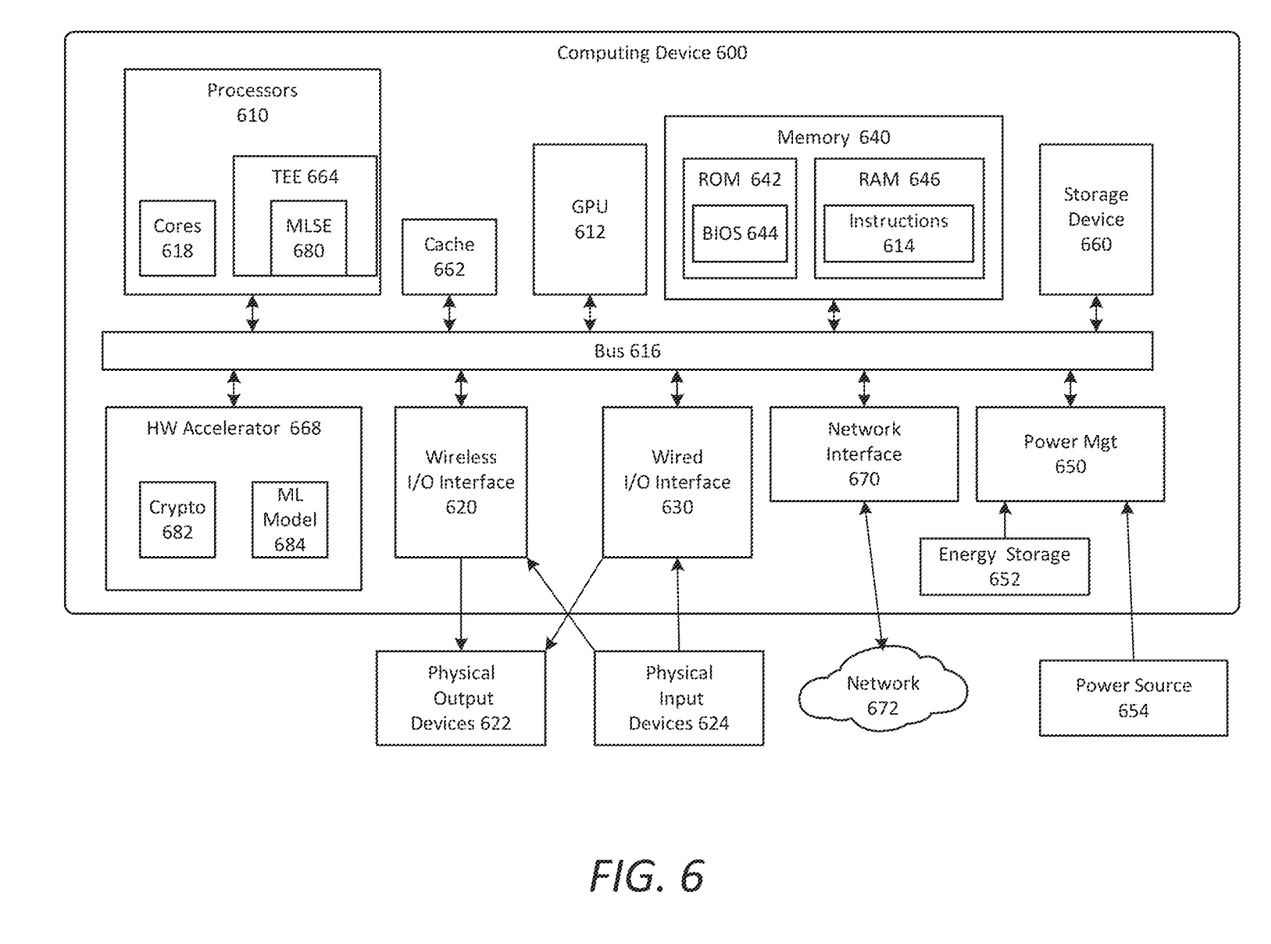
FIG. 6 illustrates one embodiment of a schematic diagram of an illustrative electronic computing device.

FIG. 6 is a schematic diagram of an illustrative electronic computing device to enable enhanced protection against adversarial attacks according to some embodiments. In some embodiments, the computing device 600 includes one or more processors 610 including one or more processors cores 618 and a TEE 664, the TEE including a machine learning service enclave (MLSE) 680. In some embodiments, the computing device 600 includes a hardware accelerator 668, the hardware accelerator including a cryptographic engine 682 and a machine learning model 684. In some embodiments, the computing device is to provide enhanced protections against ML adversarial attacks, as provided in FIGS. 1-5.

The computing device 600 may additionally include one or more of the following: cache 662, a graphical processing unit (GPU) 612 (which may be the hardware accelerator in some implementations), a wireless input/output (I/O) interface 620, a wired I/O interface 630, memory circuitry 640, power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate permissions at a computing system platform, comprising a plurality of agents, each including a non-volatile memory storing firmware executed to perform a function associated with the agent and attestation hardware to detect an update at the computing system platform, generate a cryptographic key associated with each of the plurality of agents, perform an attestation with a relying party using the generated cryptographic keys and receive a tuple associated with each of the plurality of agents, wherein a tuple includes one or more permissions indicating platform resources an agent is permitted to access.

Example 2 includes the subject matter of Example 1, wherein the attestation hardware comprises firmware measurement hardware to perform measurements of firmware at each of the plurality of agents to generate measurement data.

Example 3 includes the subject matter of Examples 1 and 2, wherein the attestation hardware further comprises key generation engine to generate a cryptographic key for each of the plurality of agents based on the measurement data.

Example 4 includes the subject matter of Examples 1-3, wherein the attestation hardware further comprises firmware to store the cryptographic keys and perform attestation with the relying party.

Example 5 includes the subject matter of Examples 1-4, wherein the attestation hardware further comprises a tuple manager to receive the tuples associated with each of the plurality of agents and verify the permissions included in each tuple.

Example 6 includes the subject matter of Examples 1-5, wherein the tuple manager transmits the permissions to the plurality of agents.

Example 7 includes the subject matter of Examples 1-6, wherein the tuple manager applies revokes the permissions to the plurality of agents upon detection of a second update at the computing system platform.

Example 8 includes the subject matter of Examples 1-7, wherein each of the plurality of agents comprises a permissions manager to provide access to resources at an agent indicated in the permissions received from the tuple manager.

Example 9 includes the subject matter of Examples 1-8, further comprising a security controller including a permissions manager to provide access to computing system platform resources indicated in the permissions received from the tuple manager.

Some embodiments pertain to Example 10 that includes at least one computer readable medium having instructions stored thereon, which when executed by one or more processors, cause the processors to detect an update at the computing system platform, generate a cryptographic key associated with each of a plurality of agents included in the computing system platform, perform an attestation with a relying party using the generated cryptographic keys and receive a tuple associated with each of the plurality of agents, wherein a tuple includes one or more permissions indicating platform resources an agent is permitted to access.

Example 11 includes the subject matter of Example 10, having instructions stored thereon, which when executed by one or more processors, cause the processors to perform measurements of firmware at each of the plurality of agents to generate measurement data.

Example 12 includes the subject matter of Examples 10 and 11, having instructions stored thereon, which when executed by one or more processors, cause the processors to generate a cryptographic key for each of the plurality of agents based on the measurement data.

Example 13 includes the subject matter of Examples 10-13, having instructions stored thereon, which when executed by one or more processors, cause the processors to verify the permissions included in each tuple.

Example 14 includes the subject matter of Examples 10-14, having instructions stored thereon, which when executed by one or more processors, cause the processors to transmit the permissions to the plurality of agents.

Example 15 includes the subject matter of Examples 10-15, having instructions stored thereon, which when executed by one or more processors, cause the processors to detect a second update at the computing system platform and revoke the permissions to the plurality of agents.

Some embodiments pertain to Example 16 that includes a method to facilitate permissions at a computing system platform, comprising detecting an update at the computing system platform, generating a cryptographic key associated with each of a plurality of agents included in the computing system platform, performing an attestation with a relying party using the generated cryptographic keys and receiving a tuple associated with each of the plurality of agents, wherein a tuple includes one or more permissions indicating platform resources an agent is permitted to access.

Example 17 includes the subject matter of Example 16, further comprising generating a cryptographic key for each of the plurality of agents based on the measurement data.

Example 18 includes the subject matter of Examples 16 and 17, further comprising verifying the permissions included in each tuple.

Example 19 includes the subject matter of Examples 16-18, further comprising transmitting the permissions to the plurality of agents.

Example 20 includes the subject matter of Examples 16-19, further comprising detecting a second update at the computing system platform and revoking the permissions to the plurality of agents.

The embodiments have been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. An apparatus comprising:
    an integrated circuit (IC) comprising:
        a plurality of hardware devices, each including a nonvolatile memory storing firmware executed to perform a function associated with the hardware device; and
        attestation hardware to detect an update at the IC, generate a cryptographic key for each of the plurality of hardware devices, perform an attestation with an external computing system using the generated cryptographic keys and receive a tuple from each of the plurality of hardware devices, wherein the tuple includes an identifier associated with a hardware device and one or more resource permissions indicating one or more resources within the IC that the hardware device is permitted to access.

2. The apparatus of claim 1, wherein the attestation hardware comprises firmware measurement hardware to perform measurements of the firmware at each of the plurality of hardware devices to generate measurement data.

3. The apparatus of claim 2, wherein the attestation hardware further generates the cryptographic key for each of the plurality of hardware devices based on the measurement data.

4. The apparatus of claim 3, wherein the attestation hardware further comprises second firmware to store the cryptographic keys and perform the attestation with a relying party.

5. The apparatus of claim 4, wherein the attestation hardware further receives the tuples associated with each of the plurality of hardware devices-and verify the permissions included in each tuple.

6. The apparatus of claim 5, wherein the attestation hardware transmits the permissions to the plurality of hardware devices.

7. The apparatus of claim 6, wherein the attestation hardware revokes the permissions to the plurality of hardware devices-upon detection of a second update at the IC.

8. The apparatus of claim 7, wherein each of the plurality of hardware devices provides access to resources at a first of the plurality of hardware devices-indicated in the permissions received from the attestation hardware.

9. The apparatus of claim 7, further comprising a security controller to provide access to IC resources indicated in the permissions received from the attestation hardware.

10. At least one non-transitory computer readable medium having instructions stored thereon, which when executed by one or more processors, cause the processors to:
    detect an update at an integrated circuit;
    generate a cryptographic key associated with each of a plurality of hardware devices included in the integrated circuit (IC);
    perform an attestation with an external computing system using the generated cryptographic keys; and
    receive a tuple from each of the plurality of hardware devices, wherein the tuple includes an identifier associated with a hardware device and one or more resource permissions indicating one or more resources within the IC that the hardware device is permitted to access.

11. The computer readable medium of claim 10, having instructions stored thereon, which when executed by the one or more processors, cause the processors to perform measurements of firmware at each of the plurality of hardware devices to generate measurement data.

12. The computer readable medium of claim 11, having instructions stored thereon, which when executed by the one or more processors, cause the processors to generate the cryptographic key for each of the plurality of hardware devices based on the measurement data.

13. The computer readable medium of claim 12, having instructions stored thereon, which when executed by the one or more processors, cause the processors to verify the permissions included in each tuple.

14. The computer readable medium of claim 13, having instructions stored thereon, which when executed by the one or more processors, cause the processors to transmit the permissions to the plurality of hardware devices.

15. The computer readable medium of claim 14, having instructions stored thereon, which when executed by the one or more processors, cause the processors to:
    detect a second update at the IC; and
    revoke the permissions to the plurality of hardware devices.

16. A method comprising:
    detecting an update at an integrated circuit (IC);
    generating a cryptographic key associated with each of a plurality of hardware devices included in the IC;
    performing an attestation with an external computing system using the generated cryptographic keys; and
    receiving a tuple from each of the plurality of hardware devices, wherein a tuple includes an identifier associated with a hardware device and one or more resource permissions indicating one or more resources within the IC that the hardware device is permitted to access.

17. The method of claim 16, further comprising generating the cryptographic key for each of the plurality of hardware devices based on measurement data.

18. The method of claim 17, further comprising verifying the permissions included in each tuple.

19. The method of claim 18, further comprising transmitting the permissions to the plurality of hardware devices.

20. The method of claim 19, further comprising:
   detecting a second update at the IC; and
   revoking the permissions to the plurality of hardware devices.

* * * * *